(12) United States Patent
Squillace et al.

(10) Patent No.: US 11,971,731 B2
(45) Date of Patent: Apr. 30, 2024

(54) COORDINATING SPATIAL AND TEMPORAL ARRIVAL OF MUNITIONS

(71) Applicant: Rosemount Aerospace Inc., Burnsville, MN (US)

(72) Inventors: Guy Squillace, Prior Lake, MN (US); Gary Willenbring, Waconia, MN (US); Todd A. Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 222 days.

(21) Appl. No.: 17/577,992

(22) Filed: Jan. 18, 2022

(65) Prior Publication Data

US 2023/0229175 A1    Jul. 20, 2023

(51) Int. Cl.
*F41G 7/22* (2006.01)
*F41G 7/34* (2006.01)
*G05D 1/00* (2006.01)

(52) U.S. Cl.
CPC ........... *G05D 1/107* (2013.01); *F41G 7/2206* (2013.01); *F41G 7/2233* (2013.01); *F41G 7/2246* (2013.01); *F41G 7/346* (2013.01)

(58) Field of Classification Search
CPC .... F41G 7/2206; F41G 7/2233; F41G 7/2246; F41G 7/346
See application file for complete search history.

(56) References Cited

U.S. PATENT DOCUMENTS

| | | | |
|---|---|---|---|
| 7,286,624 B2 | 10/2007 | Woo et al. | |
| 7,947,936 B1 | 5/2011 | Bobinchak et al. | |
| 8,748,787 B2 * | 6/2014 | Weiss | F41G 3/04 244/3.13 |
| 10,012,477 B1 * | 7/2018 | Ell | F41G 7/2253 |
| 10,114,384 B2 * | 10/2018 | Liu | G05D 1/104 |
| 10,337,835 B2 * | 7/2019 | Smith | G01S 5/0289 |
| 2016/0011318 A1 * | 1/2016 | Cohen | G01S 19/45 342/357.68 |
| 2018/0209764 A1 * | 7/2018 | Ginsberg | F41G 7/226 |
| 2021/0190459 A1 * | 6/2021 | Choiniere | F41G 7/2293 |
| 2021/0270570 A1 * | 9/2021 | Choiniere | F41G 7/008 |

* cited by examiner

*Primary Examiner* — Marcus E Windrich
(74) *Attorney, Agent, or Firm* — Locke Lord LLP

(57) ABSTRACT

A method and system for coordination of a plurality of munitions in a Global Positioning System (GPS) denied attack of a plurality of ground targets. A relative position of each munition is determined relative to the other munitions in the salvo and a distance range is determined of each munition relative to the other munitions in the salvo. A constellation formation is determined for the plurality of munitions in the salvo relative to a target seeker basket such that each munition in the constellation formation is navigated to its respective target seeker basket, whereby a change in navigation for each munition is caused when necessary such that each munition arrives at its determined seeker basket at an approximate same time.

16 Claims, 5 Drawing Sheets

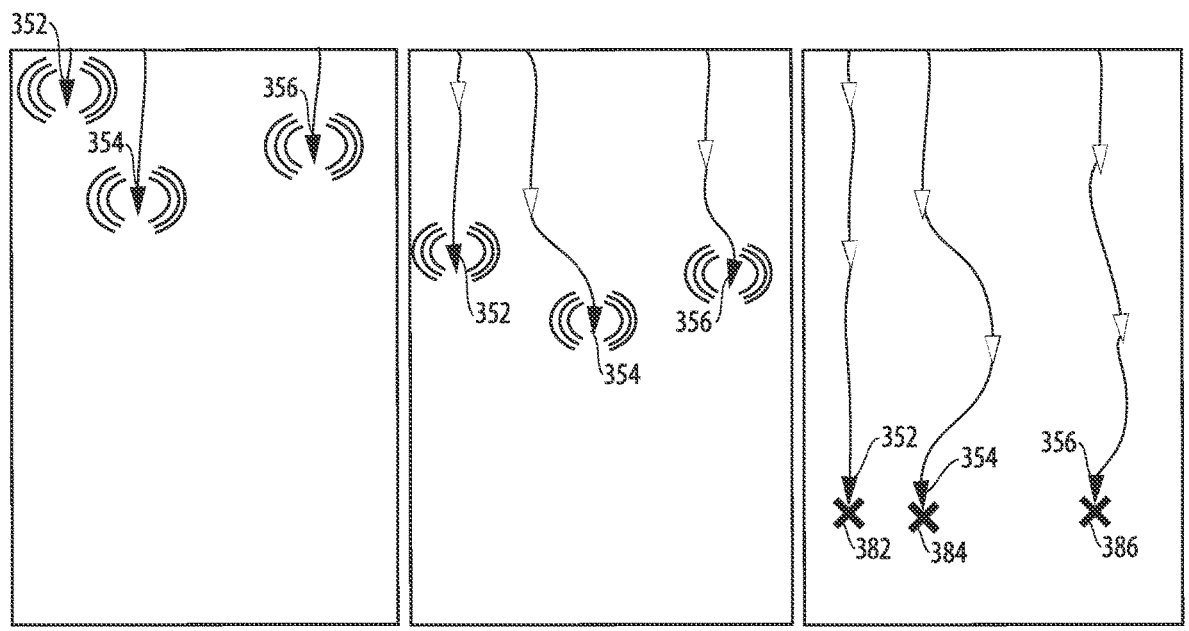

COORDINATING SPATIAL AND TEMPORAL ARRIVAL OF MUNITIONS

BACKGROUND

1. Field

The disclosed embodiments generally relate to munitions, and more particularly, to coordinating spatial and temporal arrival of munitions relative to targets.

2. Description of Related Art

When engaging one or more targets (e.g., ground targets), a salvo of multiple munitions can be used in a coordinated strike of the target(s). The salvo is often maneuverable and autonomous in flight. When munitions are provided with a datalink, they are able to share targeting data and coordinate their target selection with one another to optimize target engagement and minimize overkill. In a fire and forget scenario, the munitions guide to a designated area, which is understood to be the target seeker basket, where the target will be detectable within the field of view (FOV) of a seeker component provided on a munition. The munition often uses its seeker component to detect targets and perform automatic target recognition to determine what type of targets are visible. The munitions coordinate their target selection to engage the highest priority targets. However, it is to be understood and appreciated such a detection process often becomes problematic and complex when targets are moving or relocating.

It is to be appreciated that uncertainty in the target position increases the search space for the target, which increases the required seeker component FOV or detection range to cover a larger search space, thus increasing the cost and complexity of the seeker component. Additionally, other obstacles encountered are often due to hardware limitations. Imaging seeker components often require smaller fields of view to meet required detection ranges. Datalink antennas may also have a limited range or FOV in regard to their communication with datalink antennas provided on other munitions, thus requiring munitions to coordinate where and when they reach the seeker basket.

Additionally, poorly positioned munitions may not be able to communicate with the munition salvo. Thus, a poorly positioned munition salvo often does not locate all desired targets.

It is to be appreciated and understood that in a coordinated munition strike of an array of targets, it is often beneficial for the munitions to hit their targets at or near the same time. Differences in time of impact provide targets the opportunity to maneuver to take cover and/or retaliate. Thus, it is desirable to reduce the difference in impact time of munitions in a coordinated attack to minimize a target's window to react.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with the exemplary illustrated embodiments described herein, each munition in a munition salvo is equipped with a datalink and Two-Way Timing and Ranging (TRTW) capabilities so as to share/communicate information with other munitions in the salvo. An optimal search formation is preloaded in each munition based on the seeker FOV. Munitions coordinate using position and range information and a cost function analysis to occupy location positions in the salvo formation. By sharing targeting information amongst munitions is a salvo, each munition is enabled to combine their individual FOVs into an aggregate salvo FOV. Additionally, munitions share Estimated Time of Arrival (ETA) estimates and may perform navigational maneuvers in flight to increase ETA to minimize differences in ETA relative to other munitions in the salvo navigating towards a target seeker basket. Such temporal coordination of the munitions in a salvo effectively minimizes target reaction times between impacts while also improving salvo geometry in the scenario when a datalink has a limited viewing angle.

To achieve these and other advantages and in accordance with the purpose of the illustrated embodiments, in one aspect, a method and system for coordinating munitions in a salvo to form a constellation in a Global Positioning System (GPS) denied attack of a plurality of targets is described in which each munition is provided with a datalink communication system to communicate with other munitions and a navigation system for guiding the munition in flight. An estimated position of each munition is determined relative to the other munitions in the salvo via each munitions' datalink communication system. Two-Way Timing and Ranging (TRTW) techniques are utilized to determine positioning of each munition relative to one another. A distance range of each munition relative to the other munitions in the salvo is determined via each munitions' datalink communication system. A constellation formation of the plurality of munitions in the salvo is determined based upon the determined relative position and distance range of each munition relative to one another. A target seeker basket waypoint coordinate respectively for each munition in the constellation formation is determined relative to an array of targets. Each munition in the constellation is then navigated in flight to its respective target seeker basket waypoint coordinate via its navigation system, wherein navigating to a respective target seeker basket includes coordinating a flight path of each munition in the constellation relative to one another. And coordinating the flight path of each munition includes determining an Estimated Time of Arrival (ETA) for each munition relative to its determined target seeker basket.

BRIEF DESCRIPTION OF THE DRAWINGS

So that those skilled in the art to which the subject disclosure appertains will readily understand how to make and use the devices and methods of the subject disclosure without undue experimentation, preferred illustrated embodiments thereof will be described in detail herein below with reference to certain figures, wherein:

FIGS. 4A-4C illustrate temporal coordination of munitions in accordance with the illustrated embodiments.

DETAILED DESCRIPTION OF CERTAIN EMBODIMENTS

Aspects of the disclosed embodiments are shown in the following description and related drawings directed to specific illustrated embodiments. Alternate preferred embodiments may be devised without departing from the scope of the illustrated. Additionally, well-known elements of the illustrated embodiments will not be described in detail or will be omitted so as not to obscure the relevant details of the illustrated embodiments.

The word "exemplary" is used herein to mean "serving as an example, instance, or illustration." Any embodiment described herein as "exemplary" is not necessarily to be construed as preferred or advantageous over other embodiments. Likewise, the term "illustrated embodiments" does not require that all illustrated embodiments include the discussed feature, advantage or mode of operation.

The terminology used herein is for the purpose of describing particular embodiments only and is not intended to be limiting of the illustrated embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the illustrated embodiments may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
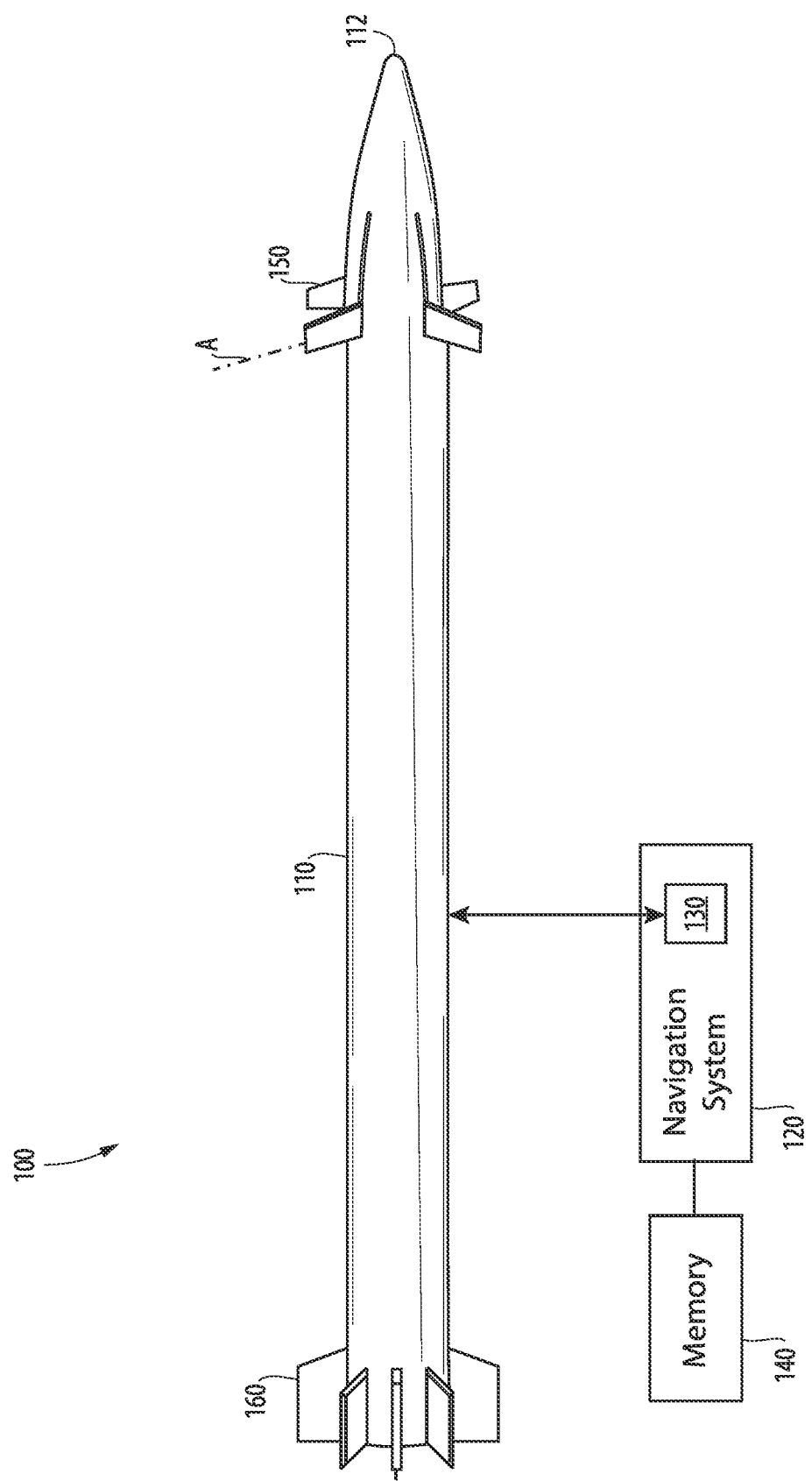
FIG. 1 illustrates schematic illustration of a munition projectile.

With reference now to FIG. 1, shown is an exemplary embodiment of a munition 100 that is a suitable exemplary environment in which certain embodiments of the below described illustrated embodiments may be implemented. FIG. 1 is an example of a suitable environment and is not intended to suggest any limitation as to the structure, scope of use, or functionality of an embodiment of the illustrated embodiments. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

For instance, the munition 100 shown in FIG. 1 is depicted as a projectile 110 (as described below). However, a munition of the illustrated embodiments described herein is not to be understood to be limited to such as projectile shown as it may encompass any suitable munition including, but not limited to: gun launched munitions; rocket propelled munitions; motor propelled munitions; air dropped munitions and Unmanned Aerial Vehicles. It is to thus be appreciated for ease of illustration, munition 100 is shown and described as a projectile 110 in FIG. 1.

As shown in FIG. 1, a munition 100 includes a navigation system 120 having at least one associated processor 130 operatively connected to a memory 140. Certain components of the navigation system 120 are described further below with reference to FIG. 2. It is to be appreciated and understood, the projectile 110 of FIG. 1 is configured and adapted to undertake the operations described below. For instance the projectile 110 may include a plurality of control surfaces 150, e.g. all-moving fins and fixed lifting surfaces with hinged control surfaces, configured to rotate about their respective deflection axes A to generate control forces and moments. Projectile 110 may also include a plurality of tail fins 160 for flight navigation.

Those skilled in the art will readily appreciate that navigation system 120 is disposed within projectile 110. Those skilled in the art will also readily appreciate that processor 130 may be of any one of numerous known processors or an application specific processor that operates in response to program instructions. Processor 130 can comprise more than one distinct processing device, for example to handle different functions, e.g. different operations of the method described below. It is also contemplated that memory 140 can be any form of memory device, for example, volatile or non-volatile memory, solid state storage device, magnetic device, or the like. It will be appreciated that memory 140 may include either, or both, RAM (random access memory) and ROM (read only memory). It will be further appreciated that memory 140 could be integrally formed as part of processor 130.

Figure 2:
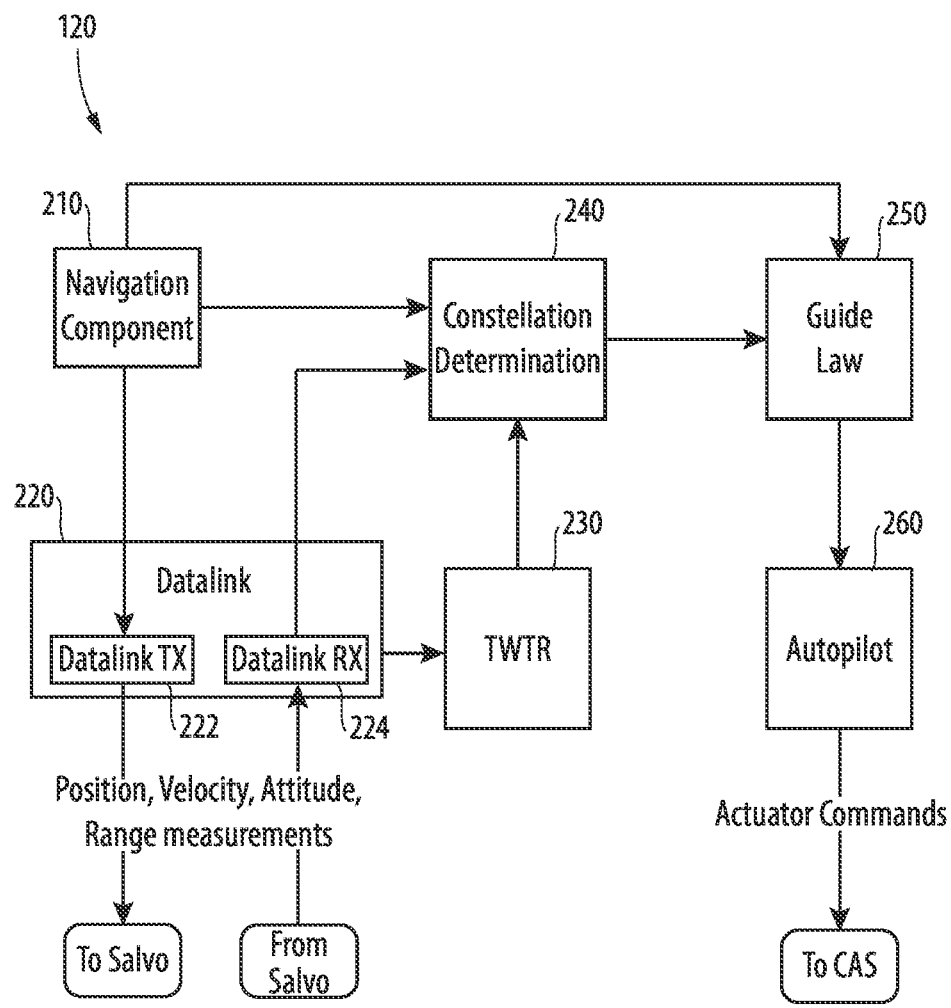
FIG. 2 illustrates schematic illustration of a navigation system utilized in the munition projectile of FIG. 1 in accordance with the illustrated embodiments.

In accordance with the certain illustrated embodiments, and with reference now to FIG. 2, the navigation system 120 of munition 100 (FIG. 1) may include and/or be communicatively coupled to the components/software modules shown in FIG. 2, as now briefly described. Navigation system 120 includes a navigation component 210 for determining positioning of the munition 100 while in flight. In particular, the navigation component 210 is configured and operable such that a munition 100 is able to estimate its position, velocity and attitude with covariance estimates using an Inertial Measurement Units (IMU), as well as any other navigation aiding solutions provided on a particular munition type. As readily understood by one of ordinary skill in the art, IMUs have been used in a wide variety of applications. For example, IMUs are commonly used in inertial guidance and navigation systems for all types of vehicles, in particular aircraft and spacecraft. Inertial navigation has the advantage of not being dependent on an external point of reference (e.g., GPS). Navigation is accomplished by sensing the motion of the munition 100 and calculating the change in position with respect to an initial position. The IMU is able to determine the three-dimensional orientation of a projectile 110 relative to a reference direction absolutely within an inertial system.

A typical IMU may consist of three equal modules, each including a gyroscopic rotational rate sensor, a linear accelerometer, and associated electronics. Each module is typically oriented on a cube or a similar structure to provide inertial measurements along one of three orthogonal axes, with the gyroscopic rotational rate sensors providing information regarding rotation of the unit and the accelerometers providing information concerning linear movement of the unit. In this way, the IMU is able to determine the position of the vehicle with respect to the vehicle's initial position to aid in guidance, navigation, and control of the vehicle.

Three-axis inertial measurement units as described above have been used extensively in aerospace applications. Traditionally, such IMUs included mechanical sensors such as conventional spinning mass gyroscopes and large mechanical accelerometers. However, most current IMUs utilize microelectromechanical systems (MEMS) devices. Many MEMS sensors are mounted on a support substrate made of silicon or a similar material and can detect acceleration by measuring a change in capacitance. Current technologies using MEMS devices encapsulate the accelerometer, gyroscope, and associated electronics into individual packages. These packages are typically soldered to a circuit board, which is then mounted on one plane of an orthogonal assembly, such as a face of a cube.

Most inertial sensors, including MEMS sensors, are perpendicular sensors or out of plane devices, meaning that the sense axis of the device is oriented at a 90 degree angle with respect to the mounting plane. Some MEMS devices, including accelerometers and gyroscopes, are in-plane sensors. In-plane sensors are inertial sensors having a sense axis that is parallel to the mounting plane. In-plane sensors detect an acceleration or rotation along an axis parallel to the surface of the support substrate.

It is to be appreciated and understood, and as know to one of ordinary skill in the art, the munition 100 further includes a seeker component (e.g., typically affixed to the nose portion 112 of a projectile 110) for recognizing a ground target (e.g., 22-28 of FIG. 1). The navigation system 120 of the munition 100 is also preloaded with a flight plan to a predetermined navigational waypoint (e.g., 382, FIGS. 3A and 3B) of a target seeker basket (e.g., 312, FIG. 3A).

In accordance with the illustrated embodiments, navigation system 120 is provided with a datalink system 220 having a datalink transmitter 222 and receiver 224 for providing direct two-way communication with other munitions 100 in a munition salvo each also having a compatible datalink system. As described further below, during flight of munitions (e.g., munitions 352-360 of FIG. 3B) in a salvo 350 (FIG. 3B), each munition 100 equipped with a datalink system 220 is enabled to communicate in real-time with each other so as to share/communicate navigation data (e.g., position coordinates, velocity, attitude and range measurements) with each other. As also described below, additional shared by the datalink system 220 may be Two-Way Timing and Ranging (TWTR) data as determined by a TWTR software module 230 provided in the navigation system 120. The TWTR software module 230 is operable to estimate ranges between the munition (e.g., munition 352 of FIG. 3B) and other munitions (e.g., munitions 354-360 within a salvo 350, FIG. 3B). Thus, in accordance with the illustrated embodiments it is to be appreciated that each munition 100 is equipped with TWTR algorithms 230 operable to estimate the range between the munitions (e.g., 352-360 of FIG. 3B) in a constellation and synchronize the onboard clock of each munition using a datalink 220.

Navigation system 120 further includes a constellation determination software module 240 which is operable to utilize the munitions navigation data from the IMU of the navigation component 210, in conjunction with determined TWTR data from other munitions in the salvo 350 (FIG. 3B) (via TWTR software module 230) to determine a munition constellation relative to targets and calculate navigation aiding measurements, as described further below. And as also further described below, the sharing of such navigation data amongst munitions in a salvo enables the navigation system 120 of each munition 100 to process the aforesaid shared navigation data in a guidance system component 250 communicatively coupled to the navigation component 210 and constellation module 240 for performing a cost function analysis of a munition in a constellation to determine navigational maneuvers for a munition in flight to achieve spatial and temporal coordination of munitions (e.g., 352-360 of FIG. 3B) in a constellation relative to target seeker baskets (e.g., 312-320 of FIGS. 3A and 3B). The determined navigational maneuvers for a munition are communicated from the guidance system component 250 to an autopilot component 260 operable to determine proper actuator commands for a munition 100 to execute the maneuvers determined by the guidance system component 250. As shown, the determined actuator commands are sent to a Control Actuation System (CAS).

With the exemplary environment of the illustrated embodiments being described above with reference to FIGS. 1 and 2, it is to be appreciated and understood that in accordance with the illustrated embodiments described is system and method in which a munition (e.g., 352, FIG. 3B) is equipped with a datalink 220 configured and operable to provide two-way timing and ranging (TWTR) capabilities (via TWTR module 230) so as to be operable in flight to communicate/share its navigation solution, synchronize its onboard clock with other munitions (e.g., 354-360, FIB. 3B) in a salvo (e.g., 350, FIG. 3B), and determine the range between itself (352) and the other munitions (354-360) in the salvo (350). Once a munition (325) is able to determine the estimated position of the other munitions (354-360) in a salvo 350, and a range to them, this enables the navigation system 120 of the munition 352 to establish its position relative to other munitions 354-360 in the salvo 350, thus creating a munition constellation. It is to be appreciated and understood that once the munition constellation is determined for a salvo 350, each munition 352-360 in the salvo 350 is configured and operable to coordinate their respective flight path so as to cover a larger target search area and/or reach a respective seeker basket (e.g., 312-322, FIG. 3A) at a common/same time.

Figure 3A:
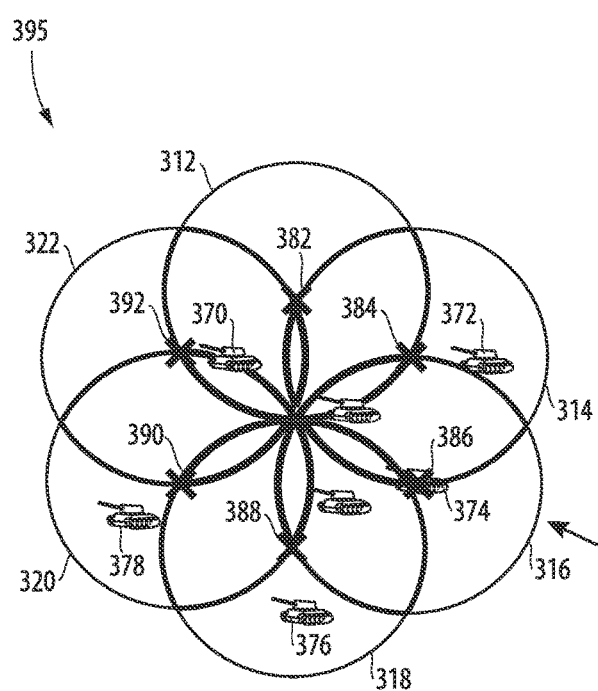
FIGS. 3A and 3B illustrate spatial coordination of munitions in accordance with the illustrated embodiments.
Figure 3B:
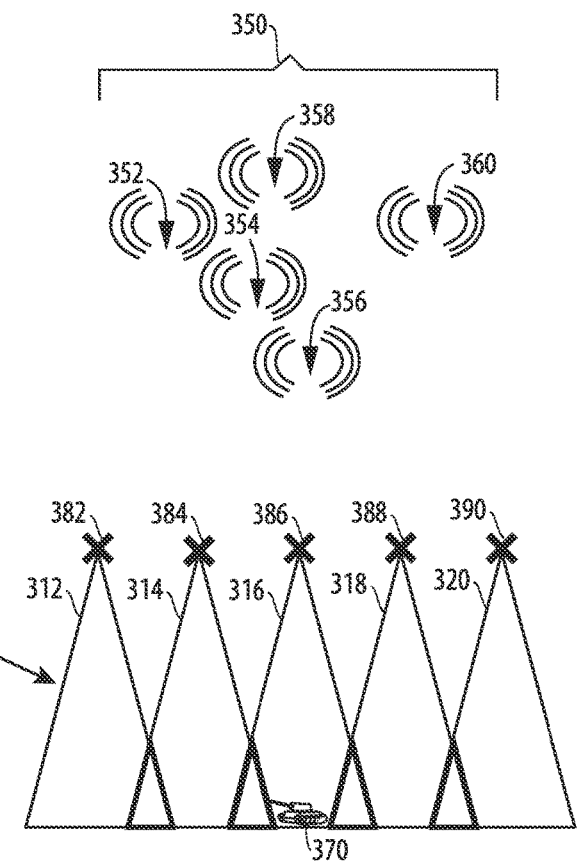

In accordance with the illustrated embodiments, it is to be understood and appreciated (and as best shown in FIGS. 3A and 3B) that to achieve spatial coordination of a munition salvo 350 regarding an array of targets (e.g., 370-380), the munitions (352-360 create a pattern around the center of the desired seeker basket (e.g., 316, FIG. 3B). It is to be appreciated that each munition (e.g., 352-360) is assigned a respective waypoint (e.g., 382-390) based on its position in the constellation and the utilization of a cost function analysis to minimize the effort to reach an assigned waypoint while maximizing the probability of finding a target (e.g., 370-380). It is to thus be appreciated that by creating such a pattern, the munitions (352-360) of a salvo 350 effectively combine their individual FOVs (e.g., 312-322)(which define seeker baskets as well when they reached a respective waypoint 382-390) into an aggregated FOV 395, wherein as shown in FIGS. 3A and 3B, each FOV 312-322 (which also defines a seeker basket) may overlap with one another.

In accordance with the illustrated embodiments, it is to be further appreciated that if the munitions 352-360 are not temporally coordinated, a munition positioned in the front of a salvo may prioritize waypoints (382-390) in the center of the pattern to maximize the likelihood of detecting a target (370-380). The munitions 352-360 can then communicate/share target detection information with one another (via a datalink system 220) to aid the other munitions in finding targets to engage. It is to be understood that as the munition constellation changes, munitions 352-360 (via their respective navigation system 120) are configured and operable to dynamically select which waypoint 382-390 in the pattern they will navigate to. For instance, and as shown in FIGS. 3A and 3B, spatial coordination of the munitions in a salvo 350 enable the munitions 352-360 to cooperate with one another (via a datalink system 120) to effectively search a larger portion of a battlefield with a limited individual FOV, which is significantly beneficial when searching for moving and/or relocating targets 370-380.

With reference now to FIGS. 4A-4C, and in accordance with the illustrated embodiments, the temporal coordination provided for munitions (e.g., 352-354) effectively minimizes a difference in the estimated time of arrival (ETA) to an assigned waypoint (e.g., 382-386, FIG. 4C) of a respective seeker basket (e.g., 312-316, FIG. 3B). As shown in FIG. 4C, reaching an assigned waypoint (e.g., 382-386) of a respective seeker basket (e.g., 312-316, FIG. 3B) near the same time is accomplished by the munitions 352-356, via each munitions 352-356 datalink, by coordinating the positions of the munitions 352-356 relative to one another. For instance, additional navigational maneuvers (e.g., 355, 357) are affected upon the munitions (e.g., 354, 356) in the front/lead portion of a constellation to increase their ETA to an assigned waypoint (e.g., 384, 386), which effectively moves them backwards in the direction of motion. It is to be appreciated that TWTR techniques enabled by the TWTR module 230 of the navigation system 120 of a munition 100 aids in providing a safe navigational flight path to perform such necessary navigational maneuvers while avoiding collision with other munitions in a constellation. Thus, it is to be appreciated that minimizing the variation in munition ETA reduces the time in which targets can react, allowing for a more efficient engagement of targets.

Figure 5:
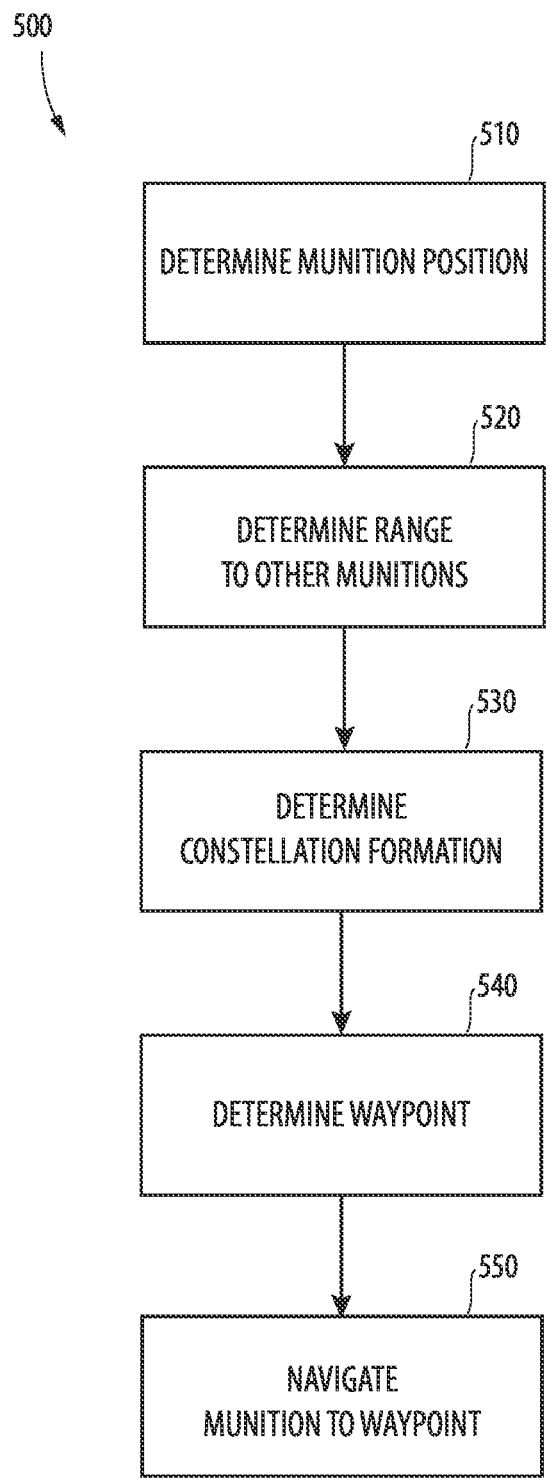
FIG. 5 is flowchart of an exemplary process for coordinating spatial and temporal arrival of munitions in accordance with the illustrated embodiments.

With reference now to FIG. 5, shown is a flow chart demonstrating implementation of the various exemplary illustrated embodiments. It is noted that the order of steps shown in FIG. 5 may not required, so in principle, the various steps may be performed out of the illustrated order. Also certain steps may be skipped, different steps may be added or substituted, or selected steps or groups of steps may be performed in a separate application following the embodiments described herein.

In accordance with the illustrated embodiments, and with reference to FIGS. 3A and 3B, and FIGS. 4A-4C, illustrated is a process 500 for coordination of a plurality of munitions 352-360 in a salvo 350 to form a constellation of munitions in a Global Positioning System (GPS) denied attack of a plurality of ground targets (e.g., 370-380). Each munition 352-360 is provided with a datalink communication system 220 in its navigation system 120. The datalink communication system 220 provides bi-lateral communication with other munitions in the salvo 350 for coordinating navigation of munitions 352-360 to respective seeker basket waypoints 382-388 for coordinating engagement with an array of targets 370-382.

Starting at step 510, and as mentioned above, each navigation system 120 of a munition 352-360 in a salvo 350 determines its position relative to the positions of the other munitions 352-360 via the communicating/sharing of positional information of each other, via the datalink communication system 220 of each munition 352-360. Two-Way Timing and Ranging (TRTW) techniques (via TRTW module 230) are utilized by the navigation system 120 of each munition 352-360 to determine positioning of each munition relative to one another in the salvo 350.

Next, at step 520, a distance range of each munition 352-360 relative to the other munitions in the salvo 350 is determined via each munitions' datalink communication system 220 provided in its respective navigation system 120. Once the relative position of a munition and its distance range to other munitions on the salvo is determined (step 520), then at step 530 a constellation formation of the munitions 352-360 in the salvo 350 is determined relative to an array of targets 370-380, which is based upon the aforesaid determined relative position and distance range of each munition relative to one another in the salvo 350.

Once the aforesaid constellation is determined (step 530), at step 540 a navigational waypoint 382-390 is determined for a respective target seeker basket 312-322 respectively for each munition 352-360 determined to be in the constellation formation relative to an array of targets 370-380. As best shown in FIG. 3A, and as mentioned above, each determined target seeker basket 312-322 may have a portion of its seeker basket overlapping with adjacent seeker baskets such that each munition 352-360 effectively combines their individual FOVs (e.g., 312-322) into an aggregate salvo FOV (e.g., 395).

Next, at step 550, and as also mentioned above and best shown in FIGS. 4A-4C, the navigation system 120 of each munition (e.g., 352-356) in an aforesaid constellation formation is caused to navigate to its respective seeker basket navigational waypoint (e.g., 382-386) coordinate (step 340) via the navigation system 120 of each respective munition (e.g., 352-356) to achieve spatial coordination of the constellation. And in regard to achieving temporal coordination of the constellation, it is to be appreciated that navigating each munition (e.g., 352-356) to its respective target seeker basket waypoint coordinate (e.g., 382-386) includes coordinating a flight path of each munition (e.g., 352-356) in the salvo relative to one another to its respective determined target seeker basket, as mentioned above with specific reference to FIGS. 4A and 4B. For instance, coordinating a flight path of each munition (e.g., 352-356) includes determining an Estimated Time of Arrival (ETA) for each munition (e.g., 352-356) relative to its respective seeker basket navigational waypoint (e.g., 382-386) coordinate (step 340), wherein the determined ETA for each munition (e.g., 352-356) relative to its determined target seeker basket (e.g., 312-316) is shared with the other munitions in the constellation. As mentioned above, a change in navigation for a munition (e.g., 352-356) is caused when necessary (FIGS. 4B and 4C) such that each munition (e.g., 352-356) arrives at its determined respective target seeker basket waypoint coordinate (e.g., 382-386) at an approximate same time (FIG. 4C).

Therefore, in accordance with the above description, the illustrated embodiments provide improved coverage of a target search area by combining munition FOVs into an aggregated larger FOV, which thus improves the search capabilities of a salvo for moving/relocating targets while also reducing processing needs and associated hardware requirements of each munition. Additionally, arrival time of munitions to a seeker basket is coordinated which minimize a target's opportunity to react to engagement by the munitions. Still further, the salvo geometry is improved enabling increased opportunities when performing coordinated target engagement of a salvo. For instance, an increased number of targets may be identified simultaneously, improving the likelihood of engaging high priority targets and reducing overkill.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method for coordination of a plurality of munitions in a salvo to form a constellation of munitions in a Global Positioning System (GPS) denied attack of a plurality of ground targets wherein each munition is provided with a datalink communication system to communicate with other munitions and a navigation system for guiding the munition in flight, the method comprising:
   determining a relative position of each munition relative to the other munitions in the salvo via each munitions' datalink communication system;
   determining a distance range of each munition relative to the other munitions in the salvo via each munitions' datalink communication system;
   determining a constellation formation of the plurality of munitions in the salvo based upon the determined relative position and distance range of each munition relative to one another;
   determining a target seeker basket coordinate respectively for each munition determined to be in the constellation formation relative to the plurality of ground targets; and
   navigating each munition in the constellation formation to its respective target seeker basket coordinate via the navigation system of each munition, wherein navigating each munition to its respective target seeker basket coordinate includes coordinating a flight path of each munition in the salvo relative to one another regarding the flight path of each munition to its respective determined target seeker basket whereby a change in navigation for each munition is caused when necessary such that each munition arrives at its determined seeker basket at an approximate same time.

2. The method for coordination of a plurality of munitions in a salvo as recited in claim 1, wherein each determined target seeker basket overlaps with at least one other determined target seeker.

3. The method for coordination of a plurality of munitions in a salvo as recited in claim 1, wherein coordinating a flight path of each munition includes determining an Estimated Time of Arrival (ETA) for each munition relative to its determined target seeker basket.

4. The method for coordination of a plurality of munitions in a salvo as recited in claim 1, wherein the change in navigation for each munition is a change in travel trajectory.

5. The method for coordination of a plurality of munitions in a salvo as recited in claim 1, wherein Two-Way Timing and Ranging (TRTW) techniques are utilized by the navigation system of each munition to determine positioning of each munition relative to one another.

6. The method for coordination of a plurality of munitions in a salvo as recited in claim 1, wherein each munition in the salvo is preloaded with a flight plan to a predetermined target seeker basket.

7. The method for coordination of a plurality of munitions in a salvo as recited in claim 1, further including each munition seeking a ground target in its assigned target seeker basket such each found ground target is communicated with the other munitions in the salvo, via the datalink communication system, such that each found ground target in the salvo is assigned for engagement with a certain munition in the constellation to maximize efficiency of the salvo striking upon the ground targets.

8. The method for coordination of a plurality of munitions in a salvo as recited in claim 1, wherein each munition in the salvo is selected from the group consisting of: gun launched munitions; rocket propelled munitions; motor propelled munitions; air dropped munitions and Unmanned Aerial Vehicles.

9. A munition navigation system for providing coordination of a munition with a plurality of other munitions in a salvo to form a constellation of munitions in a Global Positioning System (GPS) denied attack of a plurality of ground targets, comprising:
   a datalink communication system configured and operable to communicate with other munitions;
   a seeker component configured and operable for recognizing a ground target;
   a navigation system for navigating the munition in flight, wherein the navigation system is communicatively coupled to the datalink communication system and the seeker component, the navigation system having a memory configured to store instructions a processor disposed in communication with the memory, wherein the processor upon execution of the instructions is configured to:
   determine a relative position of the munition relative to the other munitions in the salvo via the datalink communication system;
   determine a distance range of the munition relative to the other munitions in the salvo via the datalink communication system;
   determine a constellation formation of the plurality of munitions in the salvo based upon the determined relative position and distance range of each munition relative to one another;
   determine a target seeker basket coordinate for the munition in the constellation formation relative to other determined target seeker basket coordinates respectively for other munitions in the salvo relative to the plurality of ground targets; and
   navigate the munition to the determined target seeker basket coordinate, wherein navigating each munition to its respective target seeker basket coordinate includes coordinating a flight path of each munition in the salvo relative to one another regarding the flight path of each munition to its respective determined target seeker basket whereby a change in navigation for each munition is caused when necessary such that each munition arrives at its determined seeker basket at an approximate same time.

10. The munition navigation system as recited in claim 9, wherein each determined target seeker basket overlaps with at least one other determined target seeker.

11. The munition navigation system as recited in claim 9, wherein coordinating a flight path of each munition includes determining an Estimated Time of Arrival (ETA) for each munition in the salvo relative to its determined target seeker basket.

12. The munition navigation system as recited in claim 9, wherein the change in navigation for the munition is a change in travel trajectory.

13. The munition navigation system as recited in claim 9, wherein Two-Way Timing and Ranging (TRTW) techniques are utilized by the guidance system to determine positioning of the munition relative to other munitions in the salvo.

14. The munition navigation system as recited in claim 9, wherein the navigation system causes the munition to seek a ground target in its target seeker basket such a found ground target is communicated with the other munitions in the salvo, via the datalink communication system, such that each found ground target in the salvo is assigned for engagement with a certain munition in the constellation to maximize efficiency of the salvo striking upon the ground targets.

15. The munition navigation system as recited in claim 9, wherein the munition is selected from the group consisting of: gun launched munitions; rocket propelled munitions; motor propelled munitions; air dropped munitions and Unmanned Aerial Vehicles.

16. A method for coordination of a plurality of munitions in a salvo to form a constellation of munitions in a Global Positioning System (GPS) denied attack of a plurality of ground targets wherein each munition is provided with a datalink communication system to communicate with other munitions and a navigation system for guiding the munition in flight, the method comprising:

determining a relative position of each munition relative to the other munitions in the salvo via each munitions' datalink communication system wherein Two-Way Timing and Ranging (TRTW) techniques are utilized by the navigation system of each munition to determine positioning of each munition relative to one another;

determining a distance range of each munition relative to the other munitions in the salvo via each munitions' datalink communication system;

determining a constellation formation of the plurality of munitions in the salvo based upon the determined relative position and distance range of each munition relative to one another;

determining a target seeker basket coordinate respectively for each munition determined to be in the constellation formation relative to the plurality of ground targets; and navigating each munition in the constellation formation to its respective target seeker basket coordinate via the navigation system of each munition, wherein navigating each munition to its respective target seeker basket coordinate includes coordinating a flight path of each munition in the salvo relative to one another regarding the flight path of each munition to its respective determined target seeker basket, and wherein coordinating a flight path of each munition includes determining an Estimated Time of Arrival (ETA) for each munition relative to its determined target seeker basket whereby a change in navigation for each munition is caused when necessary such that each munition arrives at its determined seeker basket at an approximate same time.

* * * * *